(12) United States Patent
Stamey, Jr. et al.

(10) Patent No.: US 6,911,141 B2
(45) Date of Patent: Jun. 28, 2005

(54) LOW WASTE LIQUID FILTER

(75) Inventors: Willie Luther Stamey, Jr., Kings Mountain, NC (US); Gregory Keith Rhyne, Denver, NC (US)

(73) Assignee: Wix Filtration Corp., Gastonia, NC (US)

( * ) Notice: Subject to any disclaimer, the term of this patent is extended or adjusted under 35 U.S.C. 154(b) by 156 days.

(21) Appl. No.: 10/331,985

(22) Filed: Dec. 31, 2002

(65) Prior Publication Data

US 2003/0094405 A1 May 22, 2003

Related U.S. Application Data

(63) Continuation-in-part of application No. 09/962,358, filed on Sep. 26, 2001, now Pat. No. 6,800,194.

(51) Int. Cl.⁷ .................. B01D 35/147; B01D 35/30
(52) U.S. Cl. .................. 210/85; 210/133; 210/451; 210/489; 210/493.3
(58) Field of Search .................. 210/130, 133, 210/435, 443–445, 450–452, 453, 455, 489, 492, 493.1, 493.3, 85; 123/196 A; 55/497, 511

(56) References Cited

U.S. PATENT DOCUMENTS

| | | | |
|---|---|---|---|
| 966,963 A | * | 8/1910 | Steinkoenig ............. 210/439 |
| 1,102,685 A | * | 7/1914 | Proper ..................... 210/350 |
| 2,115,577 A | * | 4/1938 | Goldman ................ 210/494.1 |
| 3,513,982 A | | 5/1970 | Carter et al. |
| 3,572,509 A | * | 3/1971 | Dexter ..................... 210/130 |
| 4,133,661 A | | 1/1979 | Strnad |
| 4,422,939 A | | 12/1983 | Sharp et al. |
| 4,976,677 A | | 12/1990 | Siversson |
| 5,292,432 A | | 2/1994 | Fujita et al. |
| 5,435,170 A | * | 7/1995 | Voelker et al. ............ 73/53.05 |
| 5,853,577 A | | 12/1998 | Gizowski et al. |
| 5,863,424 A | | 1/1999 | Lee |
| 5,885,455 A | | 3/1999 | Graus et al. |

FOREIGN PATENT DOCUMENTS

GB 2082080 A * 3/1982 ........... B01D/27/00

* cited by examiner

Primary Examiner—Matthew O. Savage
(74) Attorney, Agent, or Firm—Liniak, Berenato & White (57) ABSTRACT

A lubricating oil filter has a housing which includes a first shell providing a housing base and a second shell providing a housing lid, wherein a filter media is suspended in a space defined by the shells by being clamped between a shoulder in the housing base and a rib projecting from the housing lid. The filter media may be either a flat filter media or a pleated pack filter media. In a preferred configuration, the housing is rectangular and has both an unfiltered oil inlet and a filtered oil outlet in the first shell forming the housing base so that the filter element may be changed without disconnecting the lubricating oil filter from inlet and outlet lines.

22 Claims, 7 Drawing Sheets

LOW WASTE LIQUID FILTER

RELATED PATENT APPLICATIONS

This application is a continuation in part of U.S. patent application Ser. No. 09/962,358 filed Sep. 26, 2001 now U.S. Pat. No. 6,800,194.

FIELD OF THE INVENTION

The present invention is directed to a low waste liquid filter. More particularly, the present invention is directed to a low waste liquid filter in which the filter media used therewith is replaceable.

BACKGROUND OF THE INVENTION

For many years, internal combustion engines used by vehicles have generally relied on spin-on type oil filters for lubricating oil. These filters are periodically changed and must be disposed of. In the past lubricating oil filters were disposed of in landfills, a practice now forbidden because spin-on housings and filter media contain lubricating oil which can contaminate the soil and ground water. It is therefore the current practice to disposed of these filters in other ways.

Since spin-on filters necessarily have cylindrical housings, filter media is most conveniently annular which is not necessarily the best configuration for the filter if the filter media must be removed. This is because the axis of a spin-on type filter necessarily projects from the engine block, thus consuming additional lateral space. In order to remove the annular filter media without removing its canister, there must be space provided for both the axial extent of the canister and the axial extent of the filter media. Accordingly, the canister must be removed, opened and reclosed with a new annular filter before it is replaced.

Moreover, it is not possible to check the condition of the filter media of disposable spin-on filters, nor is it convenient to sample either filtered or unfiltered liquid.

Additionally, since the lubricating oil normally flows from an annular space external the filter media to a hollow cylindrical space within the filter media, tapping the central space within the filter media with a probe to obtain technical information (such as pressure within the filter media and the condition of just filtered oil) presents a challenge since such probes must penetrate both the housing and the closed end of the filter element of which the filter media is an integral part.

It is also preferable to be able to open the housing containing the filter element without having a portion of the housing still connected to the engine.

In view of these considerations, there is a need for oil filter configurations which address the current requirements that used filter media be recycled in a way that does not endanger the environment, while having a configuration which is conveniently mounted with respect to space available in a vehicle having an engine, while providing convenient access for inspecting the filter media and lubrication oil, and for mounting monitoring probes.

SUMMARY OF THE INVENTION

In view of the aforementioned considerations, the present invention is directed to a lubricating oil filter comprising a housing having a first shell with a first wall and a second shell having a second wall facing the first wall. A shoulder is provided on the first wall, which shoulder faces the second wall and a filter media is mounted on the shoulder in spaced relation to the first wall to define an filtered oil collection chamber between the filter media and the first wall. A rib is provided on the second wall. The rib faces the shoulder on the first wall and engages the filter media to clamp the filter media between the first and second walls, the rib being in spaced relation to the second wall to define a distribution chamber between the filter media and the second wall for receiving unfiltered lubricating oil. An unfiltered lubricating oil inlet and a filtered lubricating oil outlet are disposed in the first shell so that the second shell is not encumbered by a connection to the engine when the housing is opened. The oil outlet is connected by a passageway to the filtered oil collection chamber. The inlet is spaced from the outlet so that unfiltered lubricating oil is spread over the filter media after entering the inlet.

In a more specific aspect of the invention, the filter media is a flat sheet filter media, and in an alternative aspect of the invention, the filter media is a pleated pack filter media.

In still a more specific aspect of the invention, the housing is configured as a rectangle or square with the inlet being at one end of the rectangle or square and the outlet being at the other end of the rectangle or square.

In still further aspects of the invention, a bypass valve can be provided in the passageway of lubricating oil filter.

Still another aspect of the invention, if the filter media is a pleated pack filter media.

DETAILED DESCRIPTION

Referring now to FIGS. 1–4 there is shown a first embodiment 10 of lubricating oil filter configured in accordance with the principles of the present invention. The lubricating oil filter 10 has a housing 12 with a housing base in the form of the first shell 14 and a housing lid in the form of a second shell 16. The first shell 14 has a first base wall 18 and the second shell 16 has a top wall 20, which walls face one another in opposed relation. Disposed between the first wall 18 and the second wall 20 is a filter media 22 that is supported on a shoulder 24 which is in spaced relation to the first wall 18. Projecting from the shoulder 24 is a peripheral rim 26 which surrounds the peripheral edge of the filter media 22. The second shell 16 which forms the housing lid has a rib 32 just inside peripheral lip 33 which aligns with the shoulder 24 and nests within the first shell 14 with the peripheral lip 33 overlying the upper edge 34 of the peripheral rim 26.

Upon placing the filter media 22 on the shoulder 24 and then inserting the rib 32 of the second shell 16 into the spaced defined by the peripheral rim 26, the filter media 22 is clamped within the housing 12. The filter media is compressible adjacent its peripheral edge upon inserting and tightening bolts 40 through holes 42 in aligned lugs 45,46,47 and 48 on the first and second shells 14 and 16, respectively. The suspension of the filter media 22 in the housing 10 provides a clean side collection chamber 50 between the clean side 52 of the filter media and the side surface of the first wall 18 and a dirty side distribution chamber 56 between the second wall 20 and the dirty side 58 of the filter media 22. Sealing to seal the housing 10 and to separate the dirty side and clean side chambers 56 and 50 can be effected by compressing the filter media 22 adjacent its peripheral edge 58, or if necessary by a gasket or O-ring 59 disposed between mating surfaces of the first and second shells 14 and 16.

Figures 1, 2:
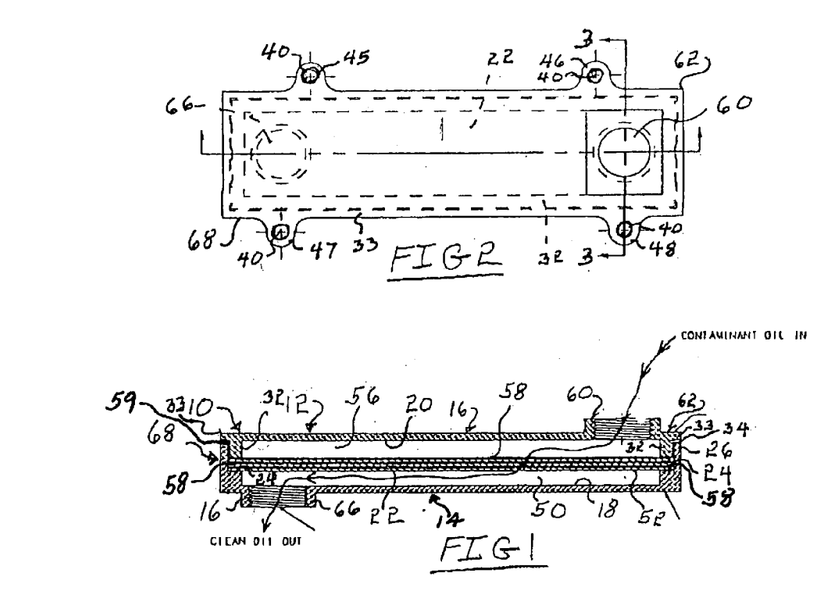
FIG. 1 is a side elevation of a first embodiment of a lubricating oil filter configured in accordance with the principles of the present invention.
FIG. 2 is a top view of the lubricating oil filter of FIG. 1, with portions in dotted lines.
Figure 3:
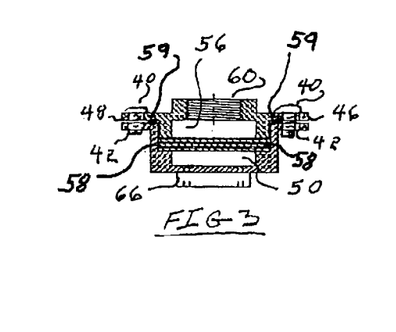
FIG. 3 is an end elevation view taken on lines 3—3 of FIG. 1.

Preferably, the housing 12 has an elongated, rectangular configuration with an unfiltered oil inlet port 60 at one end 62 of the housing 12 that communicates with the distribution chamber 56. Preferably, the filter oil inlet port 60 is an internally threaded port through the wall 20 of the upper shell 16. A filtered oil outlet port 66 is disposed at the second end 68 of the housing, the filtered oil outlet port 66 also preferably being an internally threaded port.

In operation, unfiltered oil enters the filtered oil port 66 and flows into the distribution chamber 56 where it spreads over the dirty side 58 of the filter media 22 and passes through the filter media into the collection chamber 50, from which it exits through the filtered oil outlet port 66.

Figure 4:
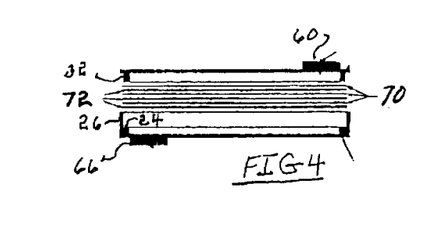
FIG. 4 is an exploded view of the filter element of the lubricating filter of FIGS. 1–3.
Figure 5:
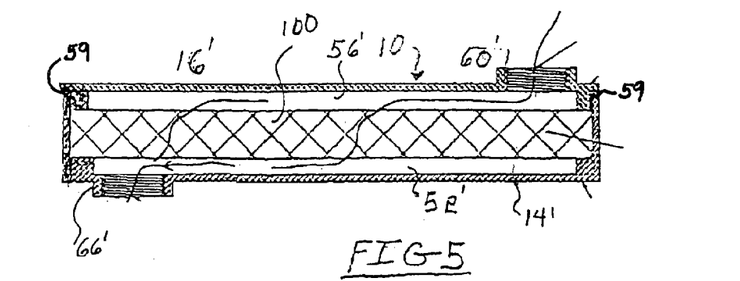
FIG. 5 is a side elevation of a second embodiment of the lubricating oil filter according to the invention.
Figure 6:
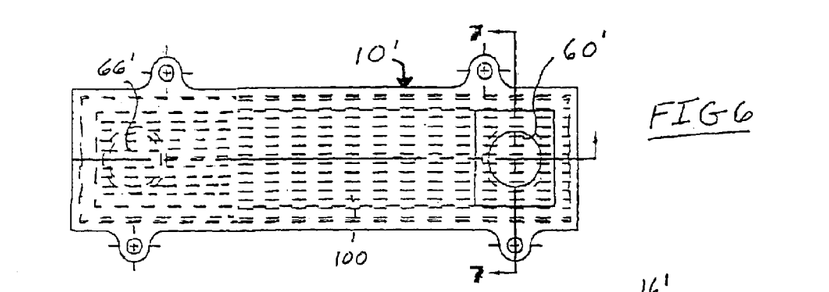
FIG. 6 is a top view of the lubricating oil filter according to FIG. 5 with portions being shown in phantom.
Figure 7:
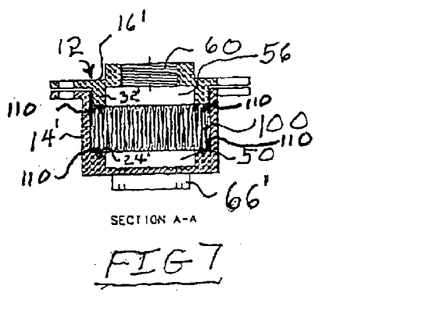
FIG. 7 is an end elevation of the lubricating oil filter in accordance with the present invention, taken along lines 7—7 of FIG. 5.
Figure 8:
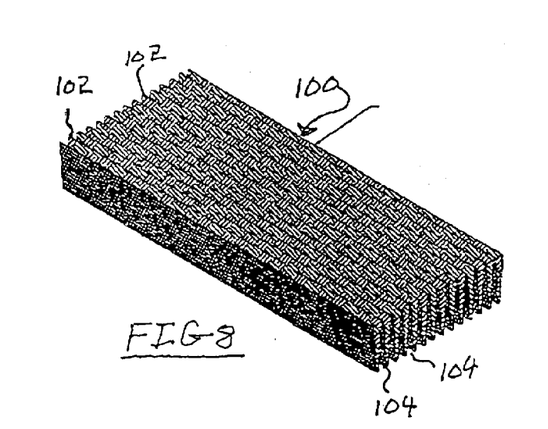
FIG. 8 is a perspective view of a pleat pack used with the embodiment of FIGS. 5–7.
Figure 9:
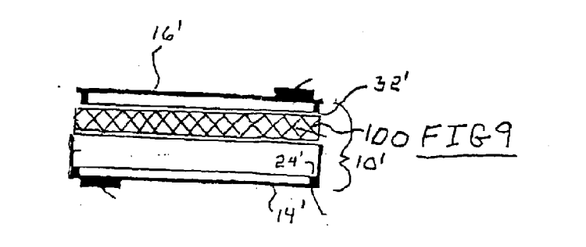
FIG. 9 is a side exploded view of the embodiment of FIGS. 5–8.

In the first embodiment 10 of the invention, the filter media 22 is preferably a flat filter media comprised of single layer or multiple layer sheets 70 of filter material with wire spacer supports 72 (see FIG. 4) therebetween. The wire spacer supports 72 may be in the form of wire screens sandwiched between the filter media layers 70. In FIG. 4 there are three layers of flat filter sheets 70 and three wire support layers 72, with the bottom support layer abutting the shoulder 24, however there may be any effective number of sheets or supports including a configuration where there is a single sheet, with or without wire supports.

Referring now to the second embodiment 10' of the lubricating oil filter shown in FIGS. 5–9, the flat filter media 22 has been replaced by a pleated pack filter media 100, wherein the pleated pack filter media includes peaks 102 and valleys 104 which extend parallel in a direction from an unfiltered oil inlet 60' to a filtered oil outlet 66'. The pleated filter media 100 may be either supported by wire mesh or be self-supporting. Preferably, the peaks and valleys 102 and 104 extend parallel to the direction of vehicle motion, if there is a need to prevent intermittent oil starvation when the vehicle is cornered sharply. In all other respects, the second embodiment 10' of the lubricating oil filter is substantially the same as the first embodiment 10 of the lubricating oil filter.

In a preferred embodiment, the shells 14 and 16 have grooves 110 defining peaks and valleys (see FIG. 7) which engage only end and side portions of the filter media 100 by mating with the valleys 104 and peaks 102 of the filter media, and thus securely suspend the filter media in the housing 10'. As with the first embodiment, compression of the peripheral portions of the filter media 100 can provide sealing of the shells 14 and 16 and provide isolation of the clean side of chamber 50 from the dirty side chamber 56. Alternately or additionally a peripheral seal 59 may be employed.

While a rectangular shape is illustrated and preferred, the lubricating oil filters 10 and 10' may have any shape so as to correspond to convenient and available spaces in a motor vehicle. In a preferable embodiment, the housing base provided by the first shell 14 is below the housing lid provided by the second shell 16 so that it is convenient to inspect the filter media 22 or 100 for trapped particles, or the oil for contamination, by simply removing the second shell which functions as a housing lid. This also allows one to conveniently remove used filter media and replace it with fresh media, all with minimal spillage of oil.

Figure 10:
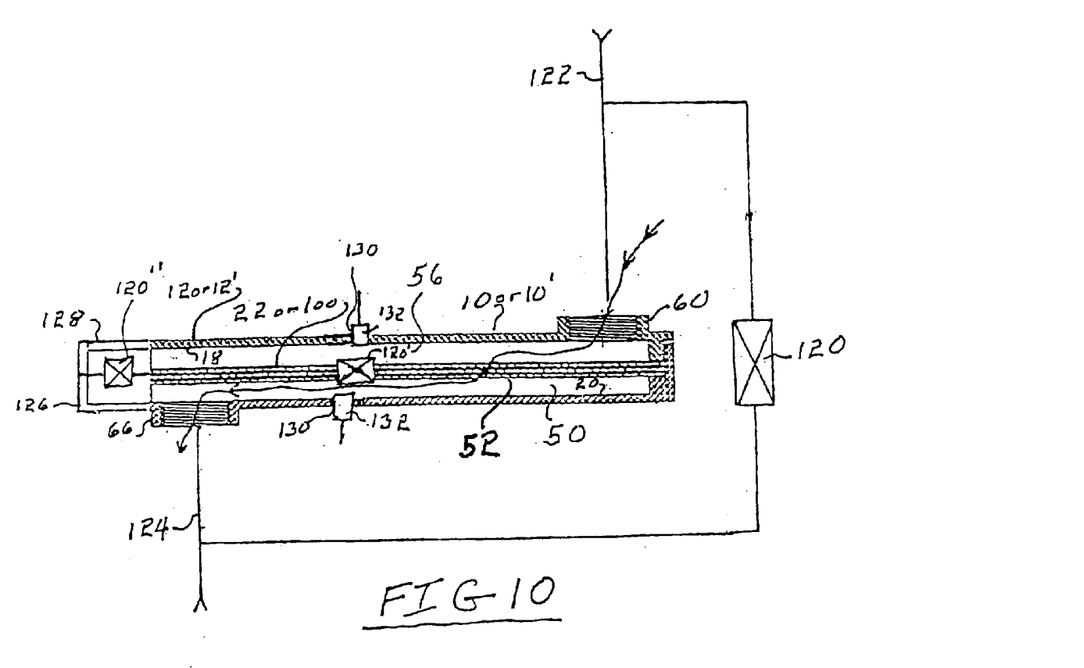
FIG. 10 is a side elevation of a filter element according to the invention showing bypass valve and sensing probe options.

As is seen in FIG. 10, a bypass valve 120 which allows continued circulation of oil when the filter media 22 or 100 becomes clogged can be installed optionally between an inlet line 122 to the unfiltered oil inlet 60 and an outlet oil line 124 connected to the filtered oil outlet 66. Alternatively, the bypass valve 120' may be integral with the filter media (22 or 100) or the bypass valve 120" may be integral with the housing 12 or 12' by extending and connecting portions 126 and 128 of the housing which connect the distribution chamber 56 to the collection chamber 50.

In addition, ports 130 with probes 132 may be placed through the first wall 18 and/or the second wall 20 to monitor conditions such as differential pressure between the dirty side 52 of the filter media 22 and 100 and the clean side 58 of the filter media. Moreover, probes 132 may be inserted through the walls 18 and 20 of the housing 12 to monitor the quality of the oil being circulated by for example, sensing the PH of the oil and/or the presence of substances in the oil, such as acids, which indicate operating conditions of the engine with which the lubricating oil filter 10 is associated. The ports 130 can also be used to fill and drain the housing 10 or to obtain oil samples for analysis.

When the need to replace the filter media 22 or 100 arises, the housing lid 16 is removed, the contaminated filter media removed, a new filter media installed, the lid replaced and the vehicle or other application put back into service. The contaminated filter media 12 or 100 is then separated from the wirebacking (if wirebacking is used) and the wire recycled. The filter media 22 or 100 is then recycled, crushed, or incinerated as required. Based on the WIX 51268R racing oil filter as an example, by weight the waste would be reduced by more than 90% (564 grams dry weight to less than 50 grams dry weight of waste). If widely employed this invention would have a substantive impact on waste generated and reduce overall environment damage and concerns associated with the disposal of used filters.

Referring now to a third embodiment of the lubricating oil filter according to the invention as is seen in FIGS. 11–16, a rectangular or square lubricating oil filter 200 has a first shell 202 that provides a base support for a filter element 204 having pleated filter media 205 and which is preferably positioned as a bottom shell. A second shell 206 covers the filter media 204, and with the first shell 202, provides a filter housing 208. As with the first and second embodiments of the invention, the pleated filter element 204 rests on a shelf 210 within the first shell 202 with a lip 212 extending down from the second shell pressing against the top peripheral edge 213 of the pleated filter media. The first shell 202 has a first wall 220 which is spaced from the dirty side 222 of the filter media 204 to define a distribution chamber 224 in the housing 208. The second shell 206 has a second wall 226 which faces the clean side 228 of the filter media 204, in spaced relation thereto, to define a collection chamber 230.

Figure 12:
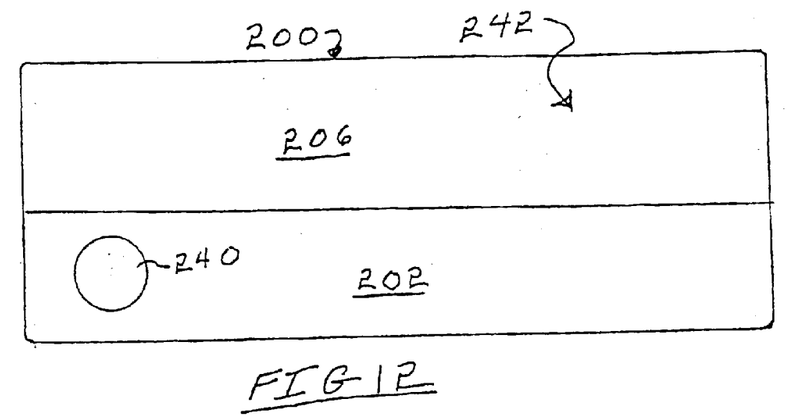
FIG. 12 is a view of a first end of the lubricating oil filter of FIG. 11.
Figure 13:
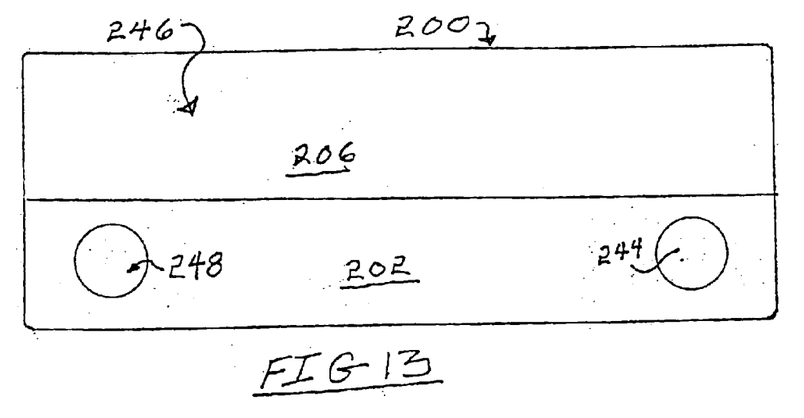
FIG. 13 is a view of a second end of the oil filter of FIG. 11.

As is seen in FIGS. 12 and 13 the first shell 202 has an unfiltered oil inlet port 240 at a first end 242 of the lubricating oil filter 200, and as seen in FIG. 13, the first shell also has a filtered oil outlet 244 at a second end 246 of the lubricating oil filter. As is further seen in FIG. 13 the second end 246 of the filter 200 may have an optional bypass valve 248 to which allows unfiltered oil to bypass the filter element 204 when the pleated filter media 205 thereof is clogged.

Figure 14:
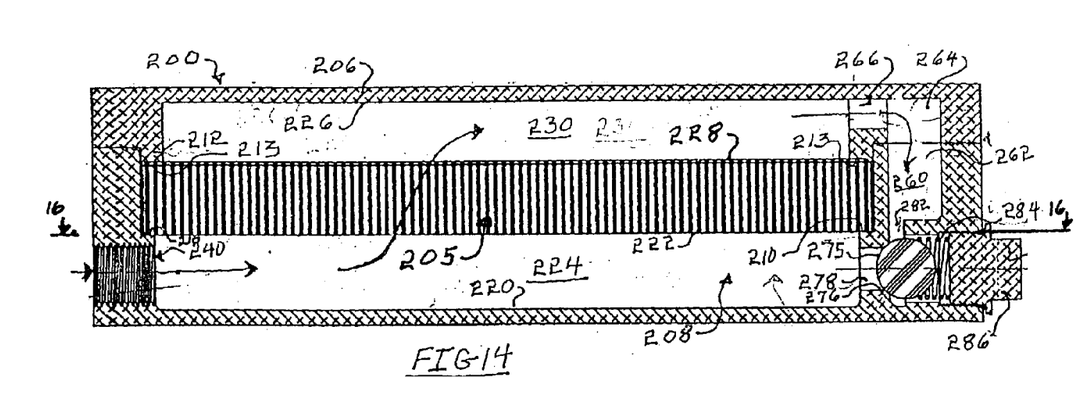
FIG. 14 is a side elevation taken along lines 14—14 of FIG. 11.
Figure 15:
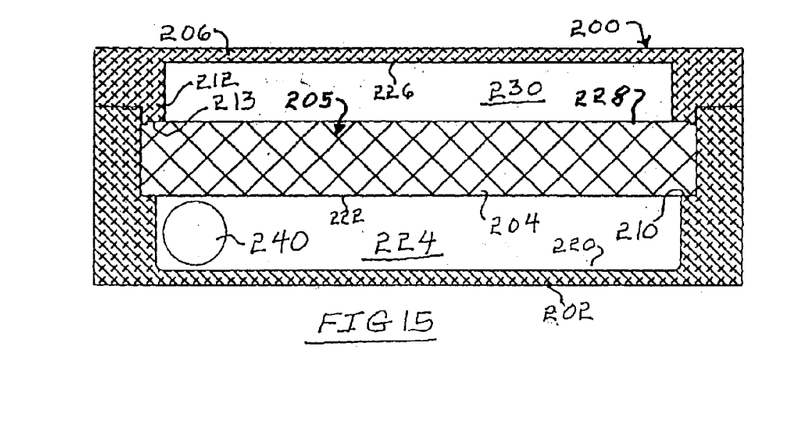
FIG. 15 is an elevation taken along lines 15—15 of FIG. 11.
Figure 16:
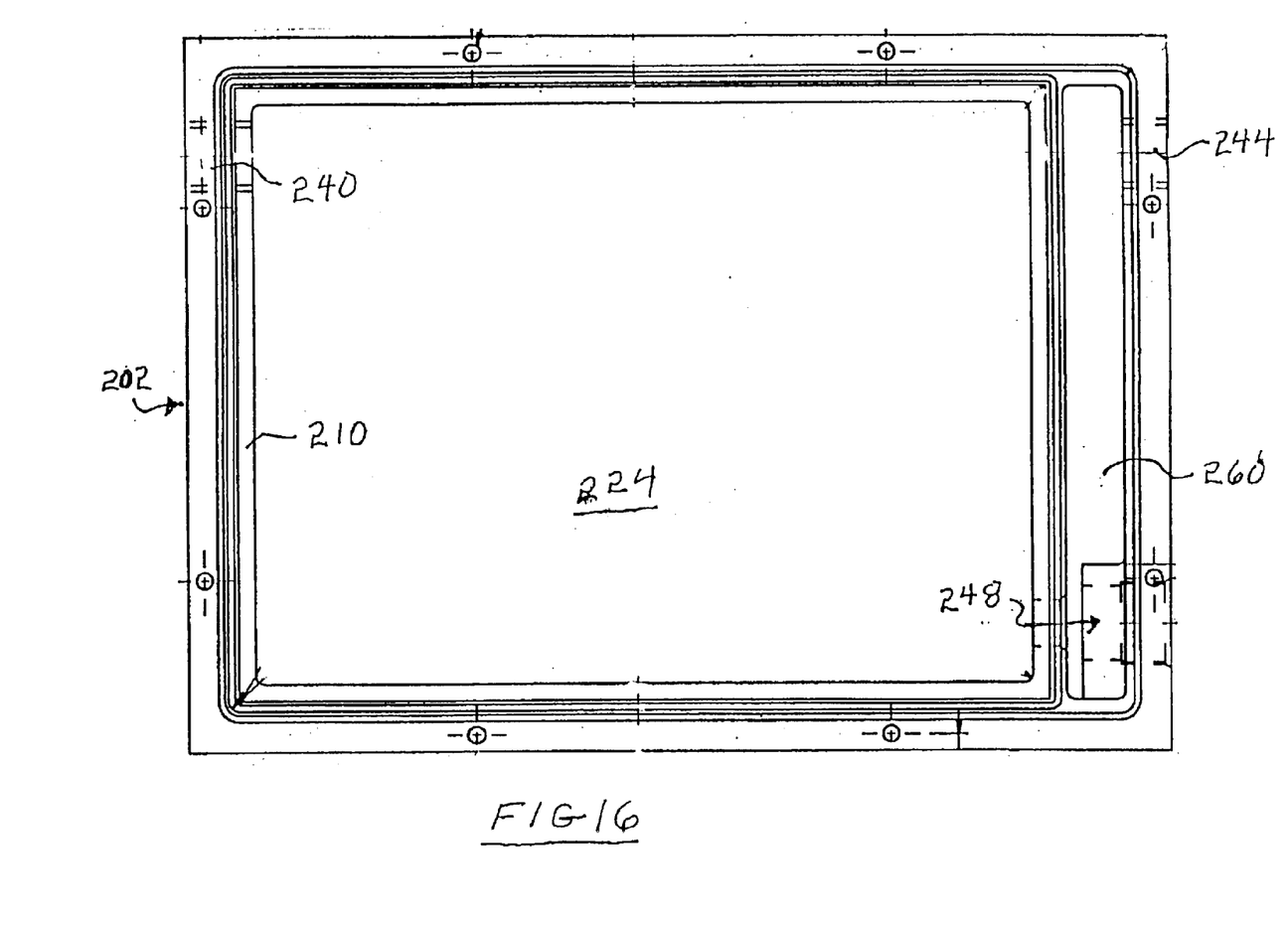
FIG. 16 is a top view of a lower shell comprising a portion of a filter housing taken along lines 16—16 of FIG. 14.

Referring now mainly to FIGS. 14 and 16, the filtered oil outlet 244 is connected to the collection chamber 230 by a passageway 260 formed in the housing 208 adjacent to the second end 246 of the housing. The passageway 260 has first portion 262 formed in the first sidewall of the first shell 202 and a second portion 264 formed in a portion of the second sidewall of the upper shell 206. The second portion 264 of the passageway 260 is connected by an opening 266 through a portion of the rib 212 and communicates with the collection chamber 230. Accordingly, filtered oil flows from the collection chamber 230, through the opening 266, and into the passageway 260 for exit through the outlet 244.

Figure 11:
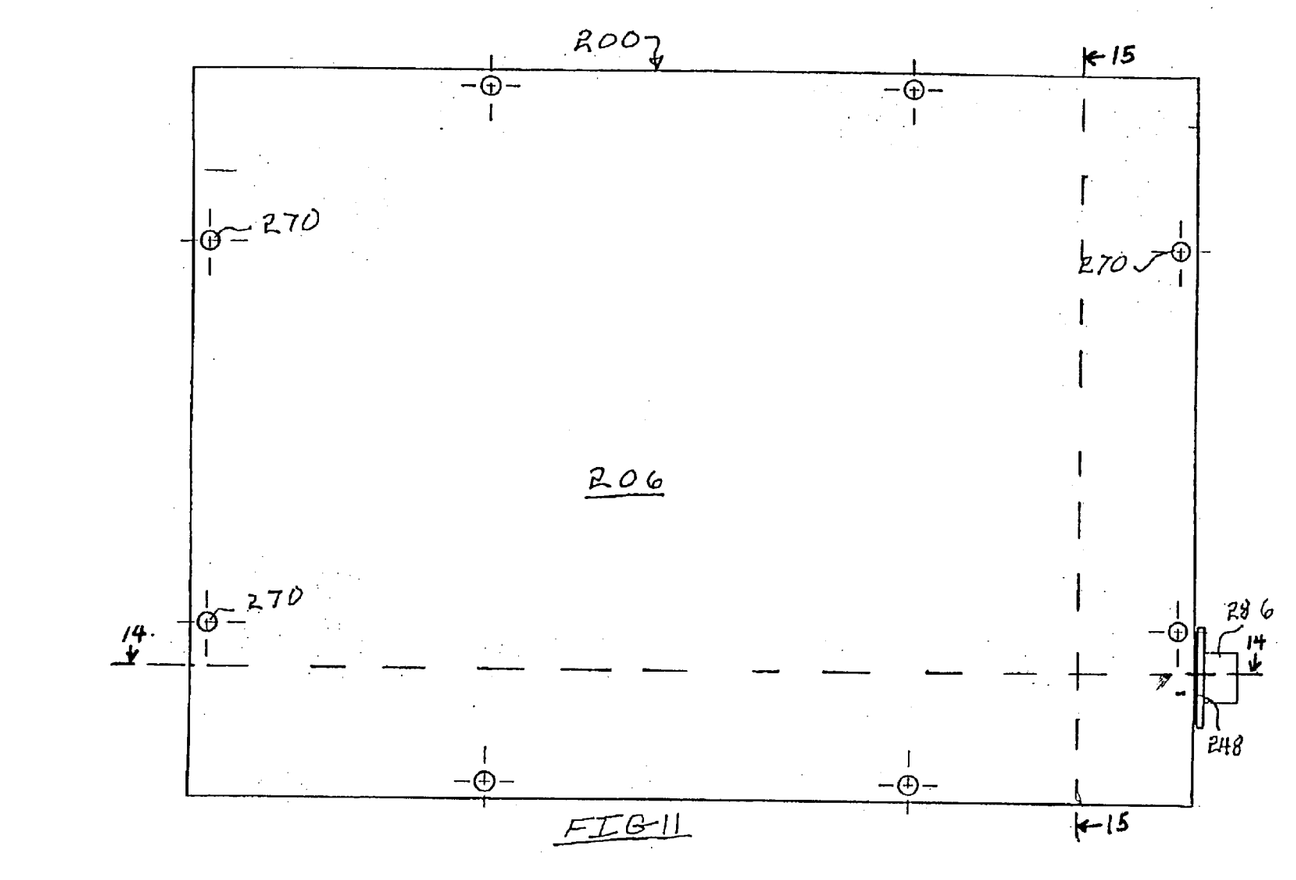
FIG. 11 is a top view of a third embodiment of a lubricating oil filter configured in accordance with the principles of the present invention.

In a preferred arrangement, the filter 200 is oriented with the first shell 202 being a bottom shell and the second shell 206 being a top shell which is retained in place on the bottom shell by an array of bolts 270 (see FIG. 11). The filtered oil enters the distribution chamber 224 through the inlet 240 in a pressurized state provided by a lubricating oil pump (not shown). The unfiltered oil then passes up through the pleated filter media 204 and into the collection chamber 230 as filtered oil. From the collection chamber 230, the oil flows through the opening 266 and into the passageway 260 from which it exits through the filtered oil outlet 248 (see FIGS. 11 and 13). Since the inlet 240 and outlet 244 are both in the lower or first shell 202 (see FIG. 16), the second shell 206 that in the preferred orientation is the top shell may be removed in order to access and change the filter element 204. Consequently, it is not necessary to disconnect inlet and outlet hoses from the unfiltered oil inlet 240 and filtered oil outlet 244 when changing the filter element 204.

As best seen in FIG. 14, the optional bypass valve 248 comprises a ball valve 275 which is urged against a valve seat 276 at one end of a valve port 278 that is in communication with the unfiltered oil distribution chamber 224. The ball value 275 is disposed in a valve chamber 280 which is connected by a passage 282 to the passageway 260. The ball valve 275 is biased by a coil spring 284 which seats against a plug 286 and urges the ball valve against the valve seat 276 to close the valve chamber 280. When the filter element 204 becomes clogged and prevents lubricating oil from flowing therethrough into the collection chamber 230, elevated pressure in the distribution chamber 224 pushes the ball valve 275 back against the bias of spring 280, allowing the unfiltered oil to flow through the passage 282 into the passageway 260. While in the passageway 260, the unfiltered oil bypasses the filter element 204 and flows to and out of the oil outlet 248.

While a pleated filter media 205 is shown in the third embodiment, the filter media may also be planar filter media such as the filter media disclosed in the first embodiment of the invention illustrated in FIGS. 1–4. The planar filter media may be a single flat sheet of filter media or a plurality of sheets of filter media which may be separated by wire separator supports inserted between the sheets of filter media as is shown in FIG. 4.

The third embodiment 200 of the filter may also be monitored by sensors, such as the sensors 130 and 132 of FIG. 10.

While the aforedescribed invention is exemplified by a lubricating oil filter the same structure may be utilized as a fuel filter, a transmission oil filter or other fluid filter.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A lubricating oil filter, comprising:
   a rectangular housing having a first shell having first and second ends, the first shell having a first rectangular wall extending between the first and second ends of said first shell, and a second shell having first and second ends, the second shell having a second rectangular wall facing the first rectangular wall and extending between the first and second ends of said second shell, the first and second ends of the first and second shells bounding a major length dimension of said rectangular housing, the second shell being detachable from the first shell;
   a first sidewall defining a shoulder on the first wall, the shoulder facing the second wall;
   a filter media mounted on the shoulder in spaced relation to the first wall capable of defining a distribution chamber between the filter media and first wall;
   a second sidewall defining a rib on the second wall, the rib facing the shoulder on the first wall and engaging the filter media to fix the filter media between the first and second walls, the rib being in spaced relation to the second wall to define a collection chamber between the filter media and second wall for receiving filtered lubricating oil;
   an unfiltered lubricating oil inlet through the first shell at the first end of the first shell and a filtered lubricating oil outlet through the first shell at the second end of the first shell, the oil outlet being connected by a passageway connecting the filtered oil collection chamber to the outlet and the inlet being spaced from the outlet, whereby unfiltered lubricating oil is spread adjacent the filter media after entering the inlet, flows through the filter media, is collected as filtered lubricating oil in the collection chamber, and passes through the outlet.

2. The lubricating oil filter of claim 1 wherein the filter media is configured as a flat sheet filter media.

3. The lubricating oil filter of claim 2 wherein the flat filter media is comprised of a plurality of sheets of filter media.

4. The lubricating oil filter of claim 3 wherein the flat filter media includes planar wire separator supports between the sheets of filter media.

5. The lubricating oil filter of claim 4 wherein the sheets of filter media are single layer sheets.

6. The lubricating oil filter of claim 1 wherein the filter media is configured as a pleated pack.

7. The lubricating oil filter of claim 1 wherein there is a bypass valve connecting the distribution chamber to the collection chamber.

8. The lubricating oil filter of claim 7 wherein the bypass valve is integral with the housing.

9. The lubricating oil filter of claim 7 wherein the bypass valve is disposed in the passageway connecting the inlet to the outlet.

10. The lubricating oil filter of claim 1 wherein at least one probe for sensing lubricating oil condition is in communication with at least one of the chambers.

11. A lubricating oil filter, comprising:

a housing having a first shell with a first wall and a second shell with a second wall facing the first wall, the second shell being detachable from the first shell;

a first sidewall defining a shoulder on the first wall, the shoulder facing the second wall;

a filter media mounted on the shoulder in spaced relation to the first wall capable of defining a distribution chamber between the filter media and first wall;

a second sidewall defining a rib on the second wall, the rib facing the shoulder on the first wall and engaging the filter media to fix the filter media between the first and second walls, the rib being in spaced relation to the second wall to define a collection chamber between the filter media and second wall for receiving filtered lubricating oil, and an unfiltered lubricating oil inlet through the first shell and a filtered lubricating oil outlet also through the first shell, the oil outlet being connected by a passageway connecting the filtered oil collection chamber to the outlet and the inlet being spaced from the outlet, wherein said passageway extends through a portion of said first and second sidewalls, whereby unfiltered lubricating oil is spread adjacent the filter media after entering the inlet, flows through the filter media, is collected as filtered lubricating oil in the collection chamber, and passes through the outlet.

12. The lubricating oil filter of claim 11 wherein the filter media is configured as a flat sheet filter media.

13. The lubricating oil filter of claim 12 wherein the flat filter media is comprised of a plurality of sheets of filter media.

14. The lubricating oil filter of claim 13 wherein the flat filter media includes planar wire separator supports between the sheets of filter media.

15. The lubricating oil filter of claim 14 wherein the sheets of filter media are single layer sheets.

16. The lubricating oil filter of claim 11 wherein the filter media is configured as a pleated pack.

17. The lubricating oil filter of claim 11 wherein said first and second walls extend between first and second ends of the housing and wherein the lubricating oil inlet is disposed at the first end of the housing and the lubricating oil outlet is disposed at the second end of the housing.

18. The lubricating oil filter of claim 17 wherein the housing is configured as a rectangle and said first and second walls are rectangular, and the first and second ends of the housing bound a major length dimension of the housing.

19. The lubricating oil filter of claim 11 wherein there is a bypass valve connecting the distribution chamber to the collection chamber.

20. The lubricating oil filter of claim 19 wherein the bypass valve is integral with the housing.

21. The lubricating oil filter of claim 19 wherein the bypass valve is disposed in the passageway connecting the inlet to the outlet.

22. The lubricating oil filter of claim 11 wherein at least one probe for sensing lubricating oil condition is in communication with at least one of the chambers.

* * * * *